Patented June 27, 1933

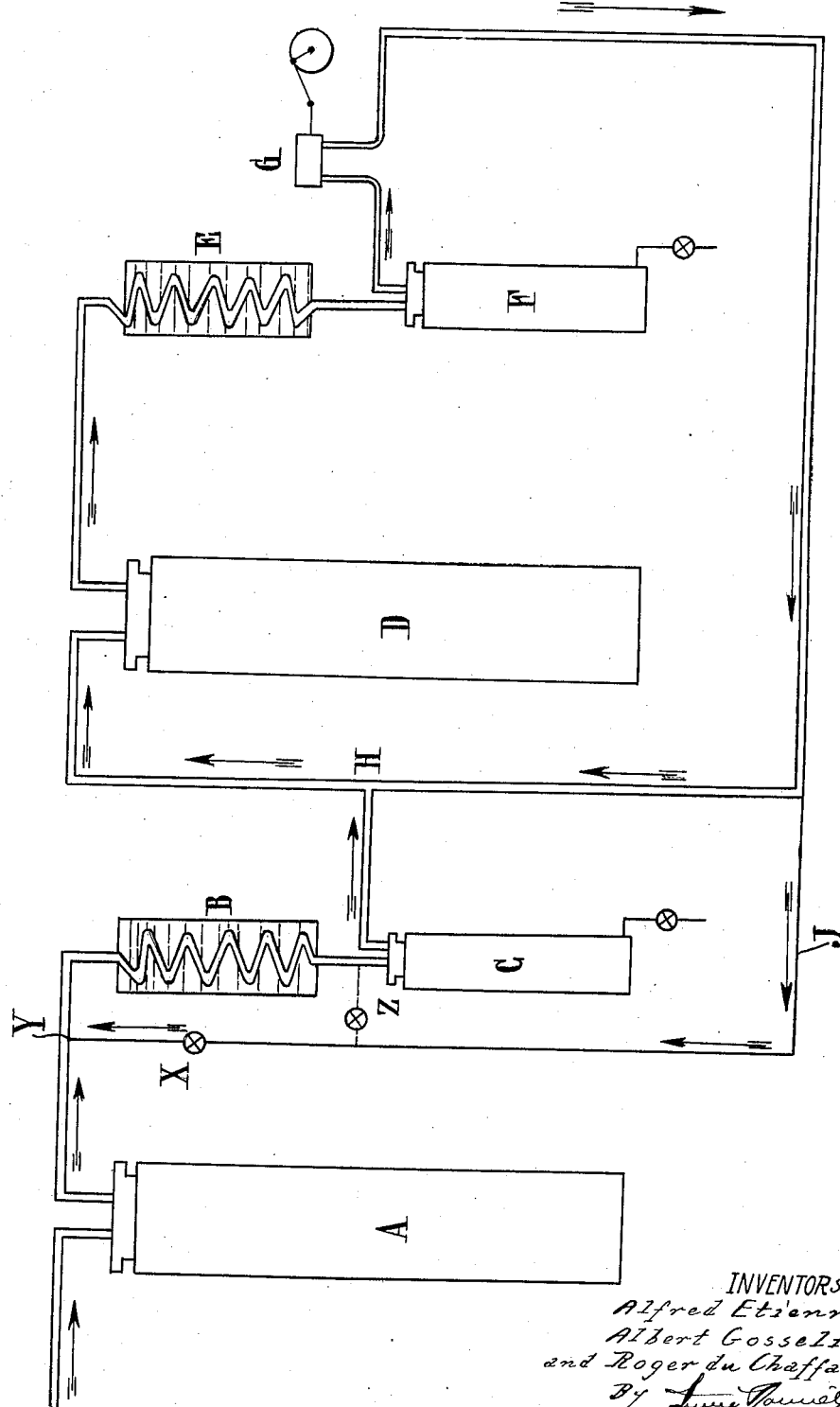

1,915,723

UNITED STATES PATENT OFFICE

ALFRED ETIENNE AND ALBERT GOSSELIN, OF MONTEREAU, AND ROGER DU CHAFFAUT, OF VARENNES SUR SEINE, FRANCE, ASSIGNORS TO L'AIR LIQUIDE, SOCIETE ANONYME POUR L'ETUDE & L'EXPLOITATION DES PROCEDES GEORGES CLAUDE, OF PARIS, FRANCE

PROCESS FOR THE PURIFICATION OF GASES FOR THE SYNTHESIS OF AMMONIA

Application filed June 13, 1930, Serial No. 461,022, and in France July 9, 1929.

The present invention relates to the purification of gases for the synthesis of ammonia, which has for its object the elimination of small quantities of carbonic acid which may be contained in the gas feeding an installation for the synthesis of ammonia.

It has been found out, particularly when this synthesis is attained by causing the gases to circulate in a closed circuit, that is to say when there is added to the fresh gas feeding the installation the gases having passed over the catalyzer and not combined, a solid deposit is formed at the point where the mixture of the two gases takes place, originating from the combination of the traces of carbonic acid of the fresh gas, with the small quantities of ammonia contained in the circulation gas. This deposit, which takes place, even when the fresh gas contains carbonic acid in too weak a proportion to be detrimental to the synthesis, obstructs at length the piping and renders difficult a continuous working.

A known means for remedying this disadvantage consists in the preliminary purifying of the fresh gas to a sufficient high degree, for example by washing with the aid of liquid ammonia or by action of metals or of alkaline amides in the solid state or melted or in the state of dissolution. These processes, however, are onerous and out of proportion with the smallness of the quantities of carbonic acid which it is desired to eliminate.

The present invention has for its object to make this disadvantage disappear in a simple and practically costless manner. It consists in letting into the gas which feeds the installation for the synthesis of the ammonia, a quantity of steam sufficing for the water formed during the further condensation of this steam to carry away in the dissolved state the whole of the ammonium carbonate at the moment of its formation by reaction of the carbonic acid, upon the ammonia and the steam contained in the gas.

A practical means for carrying out this process consists in injecting into the compressed and still warm gas issuing from the compressor or from the purification tube eliminating the carbon-monoxide before catalysis, a proportion of ammonia in the gaseous state largely corresponding to the quantity of carbonic acid to be eliminated, then to provoke, by cooling to a temperature near to the ambient temperature, the condensation of the water; the ammonium carbonate which forms remains dissolved and is easily evacuated outside the circuit at the same time as the condensation water.

In the case where the synthesis of the ammonia is operated in a closed circuit, a part of the same gas of re-circulation is preferably taken as source of ammonia which, even after the usual separation of the ammonia formed, always contains a little of the ammonia not eliminated.

The accompanying drawing illustrates diagrammatically and by way of example a method of carrying out the present invention and as applied to this latter case.

In this drawing, A represents the purification tube for the fresh gases transforming the carbon-monoxide into methane by a catalytic reaction; however, in this transformation of the carbon-monoxide, a very small quantity of carbonic acid is nearly always formed as accessory reaction of the purification reaction, according to the equation:

$$2CO + 2H_2 = CH4 + CO_2.$$

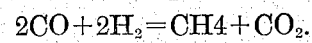

B designates the water refrigerant of the purification tube, C its separator, D is the tube for the synthesis of the ammonia, followed also by its refrigerant E and by its separator F; the pump causing the circulation of the gas not combined is designated by G.

This latter gas, repelled by G and containing a little ammonia, is mixed at H with the purified fresh gas coming out of the separator C. By the derivation tube J furnished with a regulating cock X, a small part of the re-circulation gas is deducted which is added at Y to the gas, still hot, coming out of the purification tube A and before this gas is cooled in the refrigerant B. This fresh gas thus added with ammonia passes into the refrigerant B and, under the influence of the temperature, the carbonate of ammonia forms, but it is immediately dissolved by the water which condenses at the same time. The liquid formed is carried away by the water in the separator C, from where the solution collected is drawn off to the exterior; the fresh gas thus freed of its carbonic acid no longer incurs the risk of provoking stoppages at the point H where it mixes with the principal part of the re-circulation gas.

Instead of sending the gas containing ammonia into Y, it could also be sent into Z, as indicated in dotted line.

What we claim is

1. A process for the elimination of the carbon dioxide contained in compressed fresh gases feeding a plant for the synthesis of ammonia, which comprises adding to the fresh gases a quantity of ammonia at least equal to that which is necessary for fixing as ammonium carbonate the carbon dioxide contained in the fresh gases, and a quantity of hydrogen monoxide sufficient to allow the formation, at a sufficiently low temperature, of an aqueous solution of the ammonium carbonate formed from the carbon dioxide, the added ammonia, and a part of the hydrogen monoxide, and removing said aqueous solution at said sufficiently low temperature.

2. A process for the elimination of the carbon dioxide contained in compressed fresh gases feeding a plant for the synthesis of ammonia, which comprises adding to the fresh gases a quantity of ammonia at least equal to that which is necessary for fixing as ammonium carbonate the carbon dioxide contained in the fresh gases, said addition taking place in the presence of a quantity of hydrogen monoxide sufficient to allow the formation, at a sufficiently low temperature, of an aqueous solution of the ammonium carbonate formed from the carbon dioxide, the added ammonia, and a part of the hydrogen monoxide, and removing said aqueous solution at said sufficiently low temperature.

3. A process for the elimination of the carbon dioxide contained in fresh compressed gases feeding a plant for the synthesis of ammonia, which comprises adding to the warm fresh gases water vapor and a quantity of ammonia at least equal to that which is necessary for fixing as ammonium carbonate the carbon dioxide of the fresh gases, cooling said gases down to such a temperature as to cause the condensation of an aqueous solution, and removing said aqueous solution, the temperature of the warm fresh gases being sufficiently high as to permit of the introduction therein of a quantity of water vapor sufficient for forming, when the subsequent cooling to a sufficiently low temperature takes place, an aqueous solution of the ammonium carbonate formed from the carbon dioxide, the added ammonia, and a part of the water vapor introduced into the fresh gases.

4. A process for the elimination of the carbon dioxide contained in fresh compressed gases feeding a plant for the synthesis of ammonia, which comprises adding to the fresh gases in a warm damp state a quantity of ammonia at least equal to that which is necessary for fixing as ammonium carbonate the carbon dioxide of the fresh gases, cooling said gases down to such a temperature as to cause the condensation of an aqueous solution, and removing said aqueous solution, the temperature of the warm damp fresh gases being sufficiently high as to permit of their containing a quantity of water vapor sufficient for forming, when the subsequent cooling to a sufficiently low temperature takes place, an aqueous solution of the ammonium carbonate formed from the carbon dioxide, the added ammonia, and a part of the water vapor of the fresh gases.

5. A process for the elimination of the carbon dioxide contained in fresh compressed gases feeding a plant for the synthesis of ammonia, which comprises adding to the fresh gases a quantity of ammonia at least equal to that which is necessary for fixing as ammonium carbonate the carbon dioxide of the fresh gases, said fresh gases containing liquid water in a quantity sufficient to allow the formation of an aqueous solution of the ammonium carbonate formed from the carbon dioxide, the added ammonia, and a part of said liquid water, and removing said aqueous solution.

6. A process as in claim 1 in which ammonia is added in the form of a part of the gases from the ammonia synthesis which have been freed from the larger part of the ammonia contained therein.

7. A process for the elimination of the carbon dioxide contained in fresh, compressed, carbon monoxide containing gases feeding a plant for the synthesis of ammonia, which comprises catalytically combining the carbon monoxide and a part of the hydrogen of the fresh gases to methane, water and eventually traces of carbon dioxide, adding ammonia to the fresh gases, cooling the fresh gases down to such a temperature as to cause the condensation of an aqueous solution, and removing the said aqueous solution, the added ammonia being taken in a quantity at least equal to that which is necessary for fixing as ammonium carbonate the carbon dioxide of the fresh gases and that eventually generated simultaneously with the methane and water.

8. A process for the elimination of the carbon dioxide contained in fresh, compressed, carbon monoxide containing gases feeding a plant for the synthesis of ammonia, which comprises catalytically combining the carbon monoxide and a part of the hydrogen of the fresh gases to methane, water and eventually traces of carbon dioxide; cooling the fresh gases down to such a temperature as to cause the condensation of water, adding to the water containing fresh gases a quantity of ammonia at least equal to that which is necessary for fixing as ammonium carbonate the carbon dioxide of the fresh gases and that eventually generated simultaneously with the methane and water, and removing the formed aqueous solution of ammonium carbonate.

9. A process for the elimination of the carbon dioxide contained in fresh, compressed, carbon monoxide containing gases feeding a plant for the synthesis of ammonia, which comprises catalytically combining the carbon monoxide and a part of the hydrogen of the fresh gases to methane, water and eventually traces of carbon dioxide, adding to the fresh gases a portion of the gases from the ammonia synthesis which have been freed from the larger part of the ammonia contained therein, cooling the fresh gases down to such a temperature as to cause the condensation of an aqueous solution, and removing said aqueous solution, the portion of the added gases from the ammonia synthesis being at least that which contains a quantity of ammonia sufficient for fixing as ammonium carbonate the carbon dioxide of the fresh gases and that eventually generated simultaneously with methane and water, and the temperature of the fresh gases being sufficiently high as to permit of their containing a quantity of water vapor sufficient for forming, when the subsequent cooling takes place, an aqueous solution of the ammonium carbonate formed from the carbon dioxide, the added ammonia, and a part of the water.

10. A process for the elimination of the carbon dioxide contained in fresh, compressed, carbon monoxide containing gases feeding a plant for the synthesis of ammonia, which comprises catalytically combining the carbon monoxide with a part of the hydrogen of the fresh gases to methane, water and eventually traces of carbon dioxide, cooling the gaseous mixture down to such a temperature as to cause the condensation of liquid water, adding to the fresh gases a portion of the residual gases from the synthesis of ammonia which have been freed from the larger part of their ammonia, and removing the aqueous solution formed, the portion of the added gases from the ammonia synthesis being at least that which contains a quantity of ammonia sufficient for fixing as ammonium carbonate the carbon dioxide of the fresh gases and that eventually generated simultaneously with methane and water, and the temperature of the fresh gases being sufficiently high as to permit of their containing a quantity of water vapor sufficient for forming, when the subsequent cooling takes place, an aqueous solution of the ammonium carbonate formed from the carbon dioxide, the added ammonia, and a part of the water.

In testimony whereof, we affix our signatures.

ALFRED ETIENNE.
ALBERT GOSSELIN.
ROGER DU CHAFFAUT.